United States Patent [19]

MacFarlane et al.

[11] Patent Number: 5,748,439
[45] Date of Patent: May 5, 1998

[54] CAPACITORS HAVING HIGH STRENGTH ELECTROLYTIC CAPACITOR SEPARATORS

[75] Inventors: Douglas Robert MacFarlane, Elsternwick; Alice Voelkel, Noble Park, both of Australia

[73] Assignee: Telectronics Pacing Systems, Inc., Englewood, Colo.

[21] Appl. No.: 467,041

[22] Filed: Jun. 6, 1995

[51] Int. Cl.[6] .................. H01G 9/02; H01G 9/00
[52] U.S. Cl. .................. 361/525; 361/502; 361/504; 361/512; 361/527; 204/129.75; 204/129.8; 429/129; 429/188; 429/198
[58] Field of Search .................. 361/502, 503–506, 361/512, 523–527; 429/129, 188, 198; 204/129.75, 129.8; 252/62.2

[56] References Cited

U.S. PATENT DOCUMENTS

| | | | |
|---|---|---|---|
| 3,555,369 | 1/1971 | Yoshino | 317/258 |
| 3,883,784 | 5/1975 | Peck et al. | 317/258 |
| 3,940,667 | 2/1976 | Pearce | 317/230 |
| 3,946,289 | 3/1976 | Yasuda | 317/230 |
| 4,039,905 | 8/1977 | Pearce et al. | 361/433 |
| 4,889,536 | 12/1989 | Naitoh et al. | |
| 4,942,501 | 7/1990 | MacFarlane et al. | 361/523 |
| 4,978,473 | 12/1990 | Kuroda et al. | 252/500 |
| 5,086,374 | 2/1992 | MacFarlane et al. | 361/525 |
| 5,146,391 | 9/1992 | MacFarlane et al. | 361/525 |
| 5,153,820 | 10/1992 | MacFarlane et al. | 361/525 |
| 5,162,174 | 11/1992 | Andrei et al. | 429/192 |

FOREIGN PATENT DOCUMENTS 4-184811  7/1992  Japan.

*Primary Examiner*—Bot L. Ledynh
*Attorney, Agent, or Firm*—Gottlieb, Rackman & Reisman

[57] ABSTRACT

Crosslinked elastomeric electrolytes and compatible separator materials are provided for use in electrical energy storage devices such as aluminum electrolytic capacitors and batteries. The separator material is impregnated with the electrolyte, and as a result, the electrolyte acts to strengthen the separator material, allowing a storage device to be constructed with separator materials of reduced thickness and thereby achieving an improvement in the energy density of the storage device. Methods of making such electrolytes and storage devices are also disclosed.

24 Claims, 2 Drawing Sheets

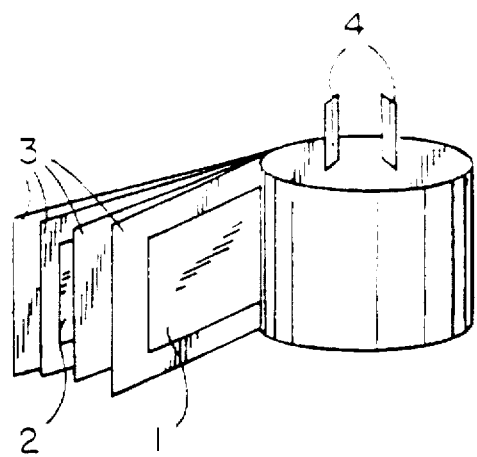
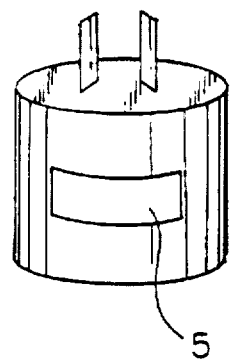
FIG. 1  FIG. 1a
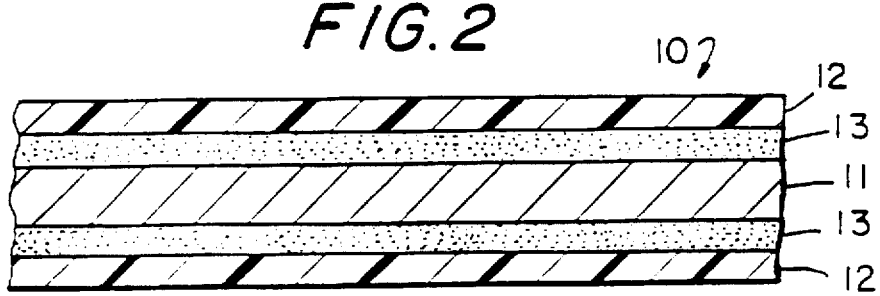
FIG. 2
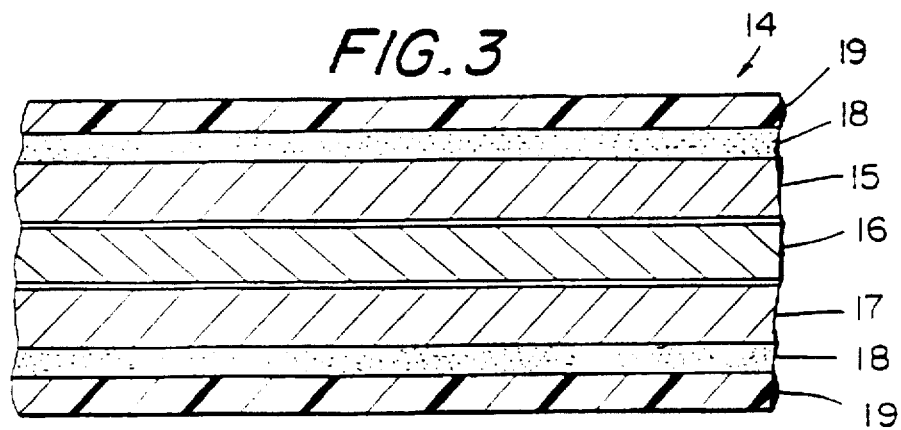
FIG. 3

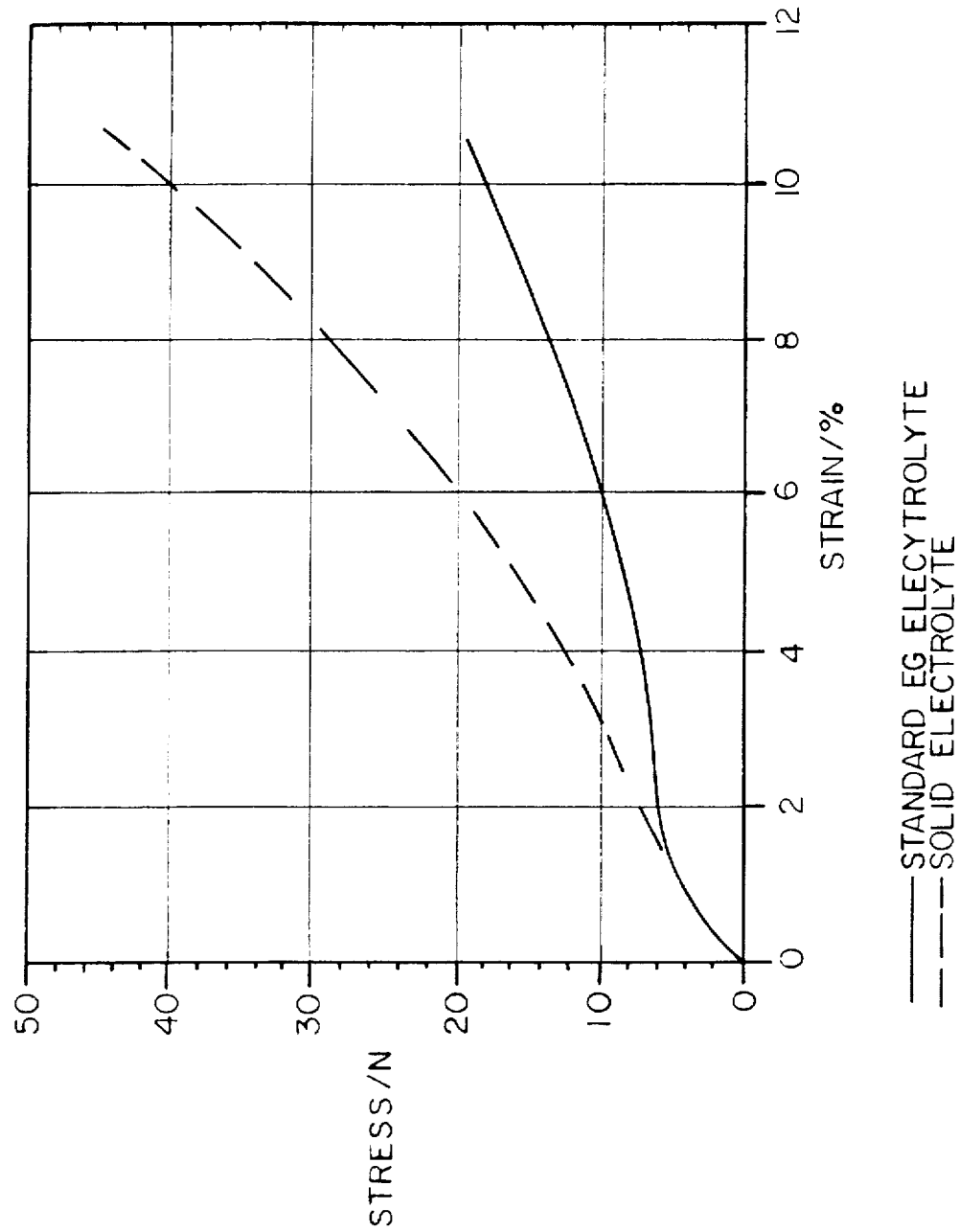

CAPACITORS HAVING HIGH STRENGTH ELECTROLYTIC CAPACITOR SEPARATORS

TECHNICAL FIELD

This invention relates to electrical energy storage devices such as electrolytic capacitors and batteries. Mote particularly, although not necessarily limited to such, it relates to electrolytic capacitors which utilize an elastomeric electrolyte and to methods of making such capacitors. Even more particularly, it relates to separator materials for use in aluminum electrolytic capacitors, and to methods of making elastomeric electrolytes that are compatible with such separator materials and act to strengthen them. A major feature of these capacitors is that they are able to employ separator materials of reduced thickness. The invention finds particular suitability for use in implantable biomedical electronic devices such as cardiac pacemakers and defibrillators.

BACKGROUND ART

Cardiac defibrillators and pacemakers are commonly designed to be implanted within a human patient. Such cardiac defibrillators include an electrical energy storage component as part of a power supply designed to provide repeated burst discharges of several joules of electrical energy. Cardiac pacemakers include similar storage components designed to supply lower energy bursts but much more frequently. Both devices therefore require energy storage components of large capacity in order to reduce the number of occasions on which the device must be explanted to renew its energy storage component. It is therefore advantageous that the energy storage component be both compact and capable of large energy storage. It is also advantageous if the energy storage component can be configured to the shape of the overall device, which is typically a flat, disc-shaped configuration to facilitate implantation subcutaneously in the patient. It is well known that aluminum electrolytic capacitors have some properties that are suited for this purpose. Nevertheless, attempts to minimize the volume of electrolytic capacitors have met with only limited success.

A capacitor of this type conventionally includes an etched aluminum foil anode, an aluminum foil or film cathode, and an interposed kraft paper or fabric gauze separator impregnated with a solvent-based liquid electrolyte. Typically, the electrolytic or ion-producing component of the electrolyte is a salt that is dissolved in the solvent. The electrolyte thus provides ionic electrical conductivity from the cathode to an oxide layer that is typically formed on the aluminum anode and that functions as a dielectric layer between the anode and the cathode.

Conventionally, the entire laminate is rolled up into the form of a substantially cylindrical body that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered structure of electrode materials with separators interposed therebetween.

Regardless of their ultimate shape and configuration, electrolytic capacitors that employ a conventional liquid electrolyte are subject to leakage, which can damage electrical components and lead to failure of the device. Sealing the device hermetically is not an adequate solution of this problem because of gases that may build up within the device. Expansion chambers adapted to receive the gases have been provided to deal with such problems, but that has led to the disadvantage of even a larger size of the capacitor.

Moreover, a liquid electrolyte commonly causes the aluminum oxide dielectric layer on the aluminum anode to de-form, and although the potential across the electrodes can result in currents that re-form the oxide layer, the de-formation results in a shorter lifetime of the formed oxide layer.

Electrolytic capacitors that employ a conventional liquid electrolyte are also inherently relatively thick. This is dues, in part, to the thickness of the mechanical separator, which is typically made of kraft paper that is impregnated with and acts as a reservoir for the electrolyte. In order to be conductive the paper must be swollen by the electrolyte, but this swelling action also makes the paper more weak and pliable. Its tensile strength is also much reduced. Thus, in order to prevent a short-circuit, the integrity of the prior art separators must be maintained by assuring that they are relatively thick. In the prior art electrolytic capacitors of the high-voltage "photoflash" type, the separators are generally no less than about 40 microns thick, and are typically made of two layers of 20 μ-thick kraft paper.

U.S. Pat. No. 3,555,369 proposed to reduce the volume of electrolytic capacitors by replacing the kraft paper separator with a semipermeable membrane of a polymeric material. However, this required that the membrane be impregnated with a solvent-based liquid electrolyte, requiring the hermetic sealing and the provision of expansion chambers to deal with the gas generated, and left unsolved the problem of the de-forming of the oxide layer of the capacitor.

U.S. Pat. No. 3,883,784 proposed to produce capacitors employing a polymeric material having ionic acceptors and ionic donors. This patent suggested interposing the polymeric material in a film in place of the kraft paper separator. Since the film was in fact thicker than the paper it was intended to replace, it did not contribute to a reduction in the size of the capacitor.

U.S. Pat. No. 4,942,501 and its continuations, U.S. Pat. Nos. 5,146,391 and 5,153,820, suggested reducing the volume of electrolytic capacitors by completely eliminating the need for a mechanical separator; they provided an electrolytic capacitor that instead employed, between its anode and cathode, a layer of solid electrolyte comprising a solid solution of a metal salt in a polymer matrix. These capacitors are immune to leakage and are smaller than prior electrolytic capacitors of comparable construction and operating properties. The preferred method of constructing these capacitors is to deposit a liquid prepolymer electrolyte mixture onto the surface of the anode, and then to cause polymerization to take place to cure the electrolyte. The cathode is thereafter formed by deposition upon the surface of the cured electrolyte layer. However, these capacitors are more costly to manufacture than those employing conventional liquid electrolytes, since they require formation of the cathode by means of non-conventional coating equipment, thus requiring substantial capital investment.

Japanese Patent Application No. JP 4-184811 also discloses a solid polymer film having both ionic and electronic conductivity which is suitable for use as an electrolyte for electrolytic capacitors, provided that it is integrated with a mechanical separator, such as kraft paper or a porous film or a fabric, so as to increase the mechanical and physical strength of the solid electrolyte. However, the details of the construction still require the use of such a separator that is at least 50 μthick.

DISCLOSURE AND BRIEF DESCRIPTION OF THE INVENTION

It is therefore an object of the present invention to provide novel and improved electrolytic capacitors which, by virtue of their structural features, avoid the aforementioned drawbacks and disadvantages.

It is a more specific object of the present invention to provide novel and improved electrolytic capacitors which, by virtue of the chemical composition of the electrolyte, enable the use of a mechanical separator of the conventional type, the thickness of which is substantially reduced, whereby such capacitors are characterized by having a volume appreciably smaller than that of the smallest electrolytic capacitors heretofore available of comparable construction.

It is a further and even more specific object of the present invention to provide novel and improved electrolytic capacitors which, by virtue of their use of conventional mechanical separators, are inexpensive to manufacture, yet are of reduced volume.

It is yet another and a still more specific object of the present invention to provide novel and improved electrolytic capacitor separators which, by virtue of the chemical composition of the electrolyte with which they are used, exhibit higher strength and stability as compared with the separators used heretofore.

It is also an object of the present invention to provide methods for making such electrolytic capacitors and separators.

In general, the objectives of the present invention are attained by utilizing, between the anode and cathode of an electrolytic capacitor, a spacer comprised of mechanical separator means such as kraft paper that is less than 40 μ thick and that is impregnated with an elastomeric electrolyte comprised of a solution of at least one salt in a crosslinked elastomeric solvent. The electrolyte is formed by polymerizing a liquid prepolymer electrolyte mixture containing the salt(s), a plasticizer, at least one polymerizable monomer, a crosslinking agent and a polymerization initiator. Optionally, this mixture may also include water.

It is a feature of the present invention that the crosslinked elastomeric electrolytes described herein are compatible with the kraft paper or other mechanical separator, act to swell it and make it conductive, but once cured also act to improve its tensile strength. As a result of this improvement, the total thickness of the paper or other separator material used can be reduced, such that an improvement in the energy density of the capacitor is achieved. An improvement in internal resistance is also achieved, other things being equal. The life of the capacitor is also improved.

BRIEF DESCRIPTION OF THE DRAWINGS

While the specification concludes with claims particularly defining and distinctly claiming the subject matter regarded as the invention herein, it is believed that the foregoing and other objects, features, characteristics and advantages of the present invention will be more readily and clearly understood from the following description, taken in conjunction with the accompanying drawings in which:

FIG. 1 illustrates an exemplary environment in which the present invention has applicability, namely, a capacitor formed in accordance with a conventional rolled construction;

FIG. 1a depicts the means of holding together the conventional rolled construction capacitor of FIG. 1;

FIG. 2 illustrates in a cross-sectional view another exemplary environment in which the present invention has applicability, namely, a capacitor formed in accordance with a known flat layered construction;

FIG. 3 is a cross-sectional view of an alternative embodiment of the layered capacitor construction of FIG. 2, in which there are multiple anodes; and;

FIG. 4 is a graph showing the results of a stress/strain analysis that was performed with respect to both a capacitor according to the invention and another capacitor of the same specifications but utilizing a prior art electrolyte.

MODES FOR CARRYING OUT THE INVENTION

As mentioned hereinabove, electrolytic capacitors are usually constructed by tightly winding the anode, separator and cathode and holding the roll together with an adhesive tape. As shown in FIG. 1, a capacitor is made by rolling an anode foil 1, with a cathode foil 2, separated by a material such as Kraft paper 3. Connections are made via tabs 4. The rolled construction is conventionally held together as indicated in FIG. 1a by a strip of adhesive tape 5.

The prior art also encompasses flat capacitor constructions, as depicted in FIGS. 2 and 3. Referring to FIG. 2 there is shown in exaggerated form the basic laminate or sandwich layer structure 10 which constitutes one layer of a capacitor. The drawing indicates the anode 11, usually a highly etched foil (the etching is not shown in this view). The cathode is indicated by layers 12. Between the cathode and anode are the separators indicated by layers 13. The layers may comprise the elastomeric electrolyte alone or they may comprise mechanical separators such as Kraft paper impregnated with the elastomeric electrolyte. In the latter case, the electrolyte saturates the separator, and in either case the electrolyte thus provides ionic electrical conductivity from the oxide coating on the anode to the cathode.

The anode can be formed from single, double or multiple plates. FIG. 3 depicts the basic laminate or sandwich layer structure 14 of a multiple anode capacitor, having anodes 15, 16 and 17, separators 18 and cathodes 19. During preparation, the anode is conventionally held in position with respect to the cathode by a press or other means.

A first or cylindrical low volume, high capacity aluminum electrolytic capacitor may be advantageously constructed in accordance with the invention by interposing, between the electrically conductive anode and cathode layer(s) thereof, a spacer comprised of mechanical separator means that is of reduced thickness as compared with the prior art, and that is impregnated with a crosslinked elastomeric electrolyte of the type described herein.

The electrolytes which are the subject of this invention are based on a polymeric component which is plasticized by a low molecular weight liquid such as ethylene glycol. In particular, these electrolytes contain:

(i) a polymeric component comprising at least one long chain polymer which is miscible with the other liquid components of the electrolyte and which is crosslinked by the addition of a crosslinker and which is compatible with the mechanical separator means and which is also compatible with and preferably a solvent for the salt component of the electrolyte;

(ii) a liquid plasticizer of low molecular weight which is miscible with the polymeric component (in both its monomer and polymerized forms) and which is a good solvent for the salt component of the electrolyte;

(iii) an ionic salt; and (iv) between 0 and 50% by weight of water.

In general, the polymeric component is chosen so as to include polar groups capable of imparting high solvation power to the polymer. Typical polymeric components that are preferred include polymers of the general structure:

—(—CH$_2$—CR$^1$R$^2$—)— where R$^1$ is an alkyl group or hydrogen and R$^2$ is a group of the type —(—CH$_2$CHR$^3$O—)$_n$—H or of the type —CO—O—(—CH$_2$CHR$^3$O—)$_n$—H, where n=0 to 20 and R$^3$ is H or CH$_3$. Among the members of this family of preferred polymers, polyhydroxyethylmethacrylate and polyhydroxyethylacrylate are most preferred. However, other long chain polymers may be utilized, including polyvinylpyrrolidinone, polyvinylsulfonic acid and other vinyl, acrylate and alkacrylate polymers. In addition, copolymers of two or more of the foregoing polymers are also of utility in this invention.

The electrolytes are crosslinked by inclusion in the prepolymer mixture of an agent capable of crosslinking the polymer component(s). The crosslinking agent may be a difunctional monomer, for example a divinyl or diacrylate or dialkacrylate compound. The content of this group will determine the tensile strength of the spacer materials ultimately obtained. The crosslinking agent can be present at concentrations in the range of from 0.015 to 20% by mole, but preferably in the range 1–4% by mole, calculated on the basis of the total of only the polymerizable components of the electrolyte.

Preferably, the liquid plasticizer of low molecular weight is ethylene glycol, although other plasticizers such as polyethylene glycol 400, propylene carbonate, dimethyl formamide, dimethylsulfoxide, diethylene glycol and any of the other liquids that are well known in the capacitor electrolyte field may be utilized instead. The content of the plasticizer in the electrolyte can be as high as 80% by weight, but such materials have lower strength than materials having a plasticizer content in the region of 30–70%.

While the electrolyte may generally contain up to 50% by weight of water, this maximum applies primarily to low-voltage capacitors (i.e., those with a working voltage that is less than 250 V); for high-voltage capacitors, it is desirable to limit the amount of water in the electrolyte to no more than about 15% by weight. On the other hand, although in general the water component of the electrolyte optionally can be omitted completely, a minimum water content of about 4% by weight is preferable, regardless of the desired working voltage of the resulting capacitor. Water can be beneficial in that it can increase the conductivity of the electrolyte and decrease the failure rate during initial ageing. On the other hand, the use of too much water can increase the leakage current of the capacitor and accordingly can be detrimental to performance. Most preferably, therefore, the electrolyte of the invention contains about 6% water, and it may be introduced by admixing the appropriate amount of water with the liquid plasticizer component of the electrolyte prior to utilization of the plasticizer.

The salt may be chosen from any of the ionic salts that have heretofore been utilized in electrolytic capacitors that incorporate solid polymeric electrolytes, particularly including those mentioned in U.S. Pat. Nos. 4,942,501, 5,146,391 and 5,153,820, the disclosures of which in relevant part are incorporated herein by reference. Preferred salts include the alkali metal, alkaline earth metal, transition metal, ammonium, substituted ammonium, lead, tin, zinc and cadmium salts of mono-, di-, tri- and tetrabasic acids, especially the ammonium salts of the lower aliphatic saturated dicarboxylic acids, e.g., pentanedioic (glutaric) acid and hexanedioic (adipic) acid. Most preferably, a mixture of two salts, particularly ammonium glutarate and ammonium adipate, in approximately equal molar concentrations, is utilized.

The electrolyte is preferably made up as a liquid prepolymer electrolyte mixture prior to impregnation into the capacitor element, and the polymer is preferably formed in situ thereafter from that prepolymer mixture. The mixture is preferably made up by first dissolving the salt(s) into the liquid plasticizer component by stirring at elevated temperatures, e.g., 65°–90° C., cooling the mixture to room temperature, and then adding to the mixture the monomer(s) corresponding to the desired polymer(s) and the crosslinking agent, as well as a polymerization initiator. Refrigeration and/or maintenance of an oxygen containing atmosphere allows the mixture to be stored for long periods without unwanted polymerization.

The polymerization initiator may be chosen from any of the initiating agents that are well known in the polymerization field, including (a) free radical initiating agents such as potassium persulfate, ammonium persulfate, azoxyisobutyronitrile, benzoyl peroxide and other suitable peroxides and persulfates, as well as any of the foregoing agents in combination with a redox co-initiator such as salts of iron or copper or sodium bisulphite; (b) ionic initiators such as butyl lithium, and (c) co-ordination catalysts such as triethyl-aluminum in combination with titanium trichloride. The choice of the polymerization initiator, and the amount of it to use, are well within the skill of the art.

In accordance with the invention, the spacer for the capacitor also comprises mechanical separator means that is impregnated with the electrolyte. The mechanical separator means may be constructed of conventional materials, such as kraft paper, gauze fabric, porous polypropylene or porous polyethylene, although kraft paper is preferred because of its widespread availability, low cost and ease of handling. The kraft paper or other mechanical separator is disposed between the anode and the cathode of the capacitor, in a layer that is of significantly reduced thickness as compared with the mechanical separators heretofore utilized in prior art capacitors of the same type and specifications. In particular, reductions in thickness of 25–50% and even somewhat beyond may be achieved with the present invention. Therefore, when the present invention is utilized in capacitors of the photoflash type, the kraft paper or other mechanical separator may be provided in a layer the thickness of which is no greater than 35 μ, preferably in the range of 18–30 μ, and most preferably bout 20 μ.

A capacitor in accordance with the present invention may be constructed by first assembling at least one capacitor element by disposing mechanical separator means of reduced thickness as described hereinabove between an anode layer and a cathode layer. Thereafter, because the viscosity of the electrolyte in its prepolymer form is low, the impregnation of the electrolyte proceeds in the same way as is standard in the art. For example, the liquid prepolymer electrolyte mixture may be impregnated into the capacitor element by vacuum impregnation. Thereafter, the capacitor element is allowed to stand for a period between 0.1 and 48 hours for complete paper impregnation to take place and is then either wound and then placed into a canister or, in the case of flat capacitor elements, placed in a press. The element is then subjected to heat, preferably by placing it into an oven at 55° C. for 3 hours and then at 70° C. for 12 hours, during which time the electrolyte cures into an elastomer. Oxygen acts as a powerful inhibitor for some of the polymerization reactions, and it is therefore preferable in those cases that air be excluded from the canister or the press during this stage.

If the crosslinked electrolyte impregnated paper separator is then removed from the capacitor and subjected to a tensile strength measurement, it is found that the strength of the separator is increased by up to 100% as compared with the paper removed from a prior art electrolyte containing capacitor of a similar type. The crosslinked electrolyte impregnated paper is also observed to have a modulus of elongation up to 100% higher than prior art materials. This property is important in determining the extent to which the paper will deform at points or regions of high local stress, for example in the vicinity of the points at which the tab is attached to the anode foil.

The aforementioned improvements in the material properties of a crosslinked electrolyte impregnated separator according to the invention are illustrated in more detail in the graph of FIG. 4. Cylindrical capacitor elements impregnated with an electrolyte in accordance with the invention were prepared as in Example 1 hereinbelow, and paper samples extracted therefrom were subjected to a stress/strain analysis in a standard tensile tester. For comparison, paper samples extracted from a cylindrical prior art liquid electrolyte capacitor element of the same specifications (manufactured by Rubycon) were subjected to the same analysis. The results as plotted on the graph of FIG. 4 confirm that the tensile strength and the modulus of stretching deformation were both higher by approximately 100% for the paper samples impregnated with the electrolyte described herein, as compared with paper samples of comparable thickness impregnated with the standard prior art liquid electrolyte.

A further advantage of the crosslinked electrolyte impregnated separator of the present invention is its adhesion to the cathode and anode foils. Because of the adhesive nature of the crosslinked electrolyte, it forms a particularly strong bond between the paper separator and the cathode and anode foils. This bond is such that in a peel test where the crosslinked electrolyte impregnated paper is peeled away from the foil, the paper will disintegrate and delaminate within itself before the bond to the foil is ruptured. This property is of particular importance to the flat electrolytic capacitor construction in which a number of anode foil pieces are interleaved with paper and cathode foil to create a flat multilayer structure. In this design, there is no equivalent of the winding tension that exists in a rolled cylindrical element to hold the layers together. However, the crosslinked electrolyte acts as a bonding agent in this design so as to bond the foils and papers securely together such that contact between the layers is maintained.

The manufacture of electrolytic capacitors embodying the principles of the present invention is further explained by the following examples, which also serve to illustrate the formulation and operation of the materials.

EXAMPLE 1

A solution of 7 parts ammonium adipate and 7 parts ammonium glutarate in 65 parts of ethylene glycol is made up by stirring at 70° C. After cooling to room temperature the solution is mixed with 35 parts of 2-hydroxyethylmethacrylate, 2 parts of tetraethyleneglycol diacrylate and 0.2 parts of a saturated solution of ammonium persulfate in water. The solution is then stored at or below room temperature until needed.

A spirally wound capacitor element consisting of two layers of anode material, 2 layers of 20 μ thick kraft paper, a cathode foil and a further two layers of 20 μ thick kraft paper is impregnated with the electrolyte by removing air from the element under vacuum and then flooding with the electrolyte under vacuum. After the element has been completely impregnated by the electrolyte, the element is removed from the container and pressed into an aluminum canister. The canister is then placed in a container from which air is excluded by flushing with nitrogen and the container placed in an oven at 55° C. for 3 hours and 70° C. for 12 hours during which time the electrolyte cures into an elastomer. The capacitor is then aged by charging to full working voltage at maximum operating temperature.

Although the chemical components of this Example 1 are in accordance with the invention, this example was created expressly for the purpose of comparison with prior art electrolytic capacitors, as explained in further detail hereinabove in connection with the graph of FIG. 4, and therefore this example is not representative of the reduction in the thickness of the mechanical separator that can be achieved using the present invention. Specifically, the kraft paper separators used in this Example 1 were purposely chosen to be of the same thickness (40 μ) as the kraft paper separators used in the prior art capacitors, so that the results of the stress/strain analysis could be compared. The capacitor constructions set forth in the remaining examples are representative of the reduction in the thickness of the mechanical separator that can be achieved using the present invention.

EXAMPLE 2

A capacitor is constructed as in Example 1, except that in the construction of the element only one 20 μ thick layer of kraft paper is used on either side of the cathode. The resultant element has a smaller volume because of the smaller volume of paper used. The crosslinked electrolyte serves to increase the tensile strength of the paper such that no degradation in capacitor performance is observed, i.e., the same separating effect as is achieved in the prior art with two layers of paper (40 μ) is achieved in this example with only one layer of paper (20 μ).

EXAMPLE 3

A solution of 7 parts ammonium adipate and 7 parts ammonium glutarate in 65 parts of ethylene glycol is made up by stirring at 70° C. After cooling to room temperature the solution is mixed with 35 parts of 2-hydroxyethylmethacrylate, 1 part of tetraethyleneglycol diacrylate and 0.2 parts of a saturated solution of ammonium persulfate in water. The solution is then stored at or below room temperature until needed.

A capacitor element is constructed by interleaving rectangular segments of anode foil 35 mm×45 mm between 20 μ thick layers of kraft paper and cathode foil. The element has dimensions 45 mm×35 mm×2.5 mm, and is impregnated with electrolyte under vacuum. In a low oxygen handling chamber, the excess electrolyte is removed, the element placed in a press such that pressure is applied to the large face of the element and the press is placed in a sealed container in an oven at 55° C. for 3 hours and 70° C. for 12 hours, during which time the electrolyte cures into an elastomer. The result is a flat profile capacitor in which the electrolyte acts as a bonding agent to hold the various layers together without any need for compression to be applied via a rigid case.

EXAMPLES 4–5

In these examples, the procedures and chemical components are the same as in Examples 2 and 3, respectively, except that the monomer is replaced by 2-hydroxyethylacrylate. The result in each case is a capacitor with improved ESR as compared with the capacitors of the earlier examples in which 2-hydroxyethylmethacrylate was used.

9

EXAMPLES 6–9

In these examples, the procedures and chemical components are the same as in Examples 2–5, respectively, except that the plasticizer is replaced by polyethylene glycol 400. The result in each case is an electrolyte with improved adhesion and strength as compared with the electrolytes of the earlier examples in which ethylene glycol was used.

EXAMPLES 10–17

In these examples, the procedures and chemical components are the same as in Examples 2–9, respectively, except that an amount of water is added to the plasticizer such that about 5% by weight of the final electrolyte is water. The result in each case is an electrolyte with increased conductivity, yielding a capacitor with improved ESR and decreased failure rate, as compared with the electrolytes and corresponding capacitors of the earlier examples in which no water was added to the plasticizer.

EXAMPLES 18–25

In these examples, the procedures and chemical components are the same as in Examples 3, 5, 7, 9, 11, 13, 15 and 17, respectively, except that the tetraethyleneglycol diacrylate content is 0.5 parts and the ammonium persulfate content is 1.0 parts. The result in each case is an electrolyte with improved tensile strength as compared with the electrolytes of the earlier examples in which 1 part of tetraethyleneglycol diacrylate and 0.2 parts of ammonium persulfate were used. The electrolytes of these Examples 18–25 are particularly suited for use in a flat multilayer capacitor construction, wherein they also act as a bonding agent due to their adhesive nature.

Although the invention has been described with reference to particular embodiments, it is to be understood that such embodiments are merely illustrative of the application of the principles of the invention. Hence numerous other modifications may be made therein and other arrangements may be devised. While there have been shown and described what are presently considered to be the preferred embodiments of this invention, it will be obvious to those skilled in the art that various other changes may be made without departing from the broader aspects of the invention. It is, therefore, aimed in the appended claims to cover all such changes and modifications as fall within the true spirit and scope of the present invention.

We claim:

1. A low volume, high capacity storage device comprising an electrolytic capacitor having at least one anode layer, at least one cathode layer, and a spacer disposed therebetween, said spacer comprising mechanical separator means comprising kraft paper the thickness of which is no greater than about 35 μ and an elastomeric electrolyte comprising a crosslinking agent and at least one salt in an ionically conductive carrier of high solvation power, wherein said separator means is impregnated with said electrolyte.

2. A storage device according to claim 1 wherein said carrier comprises a crosslinked polymer matrix.

3. A storage device according to claim 2 wherein said crosslinked polymer matrix comprises (a) a polymeric component and (b) a plasticizer comprising a liquid of low molecular weight in which said at least one salt is soluble.

4. A storage device according to claim 3 wherein said polymeric component comprises a polymer formed from at least one polymerizable monomer chosen from the group consisting of unsaturated mono-, di-, tri- and poly-functional compounds having alkyleneoxide repeat units.

10

5. A storage device according to claim 3 wherein said polymeric component comprises a polymer formed from at least one polymerizable monomer that is terminated with an unsaturated functional moiety selected from the group consisting of vinyl, acrylic and alkacrylic.

6. A storage device according to claim 3 wherein said polymeric component is a solvent for said at least one salt and comprises at least one compound chosen from the group consisting of polyvinylpyrrolidinone, polyvinylsulfonic acid, polyhydroxyethylacrylate, polyhydroxyethylmethacrylate, polymers of the general structure

—(—CH$_2$—CR$^1$R$^2$—)

where R$^1$ is an alkyl group or hydrogen and R$^2$ is a group of the type —(—CH$_2$CHR$^3$O—)$_n$—H or of the type —Co—O—(—CH$_2$CHR$^3$O—)$_n$—H where n=0 to 20 and R$^3$ is H or CH$_3$, and copolymers thereof.

7. A storage device according to claim 3 wherein said plasticizer is selected from the group consisting of ethylene glycol, polyethylene glycol 400, propylene carbonate, dimethyl formamide, dimethylsulfoxide and diethylene glycol.

8. A storage device according to claim 7 wherein said plasticizer comprises ethylene glycol.

9. A storage device according to claim 3 wherein said crosslinked polymer matrix further comprises water in an amount not less than about 4% by weight of said electrolyte.

10. A storage device according to claim 9 wherein said capacitor is of the high voltage type, and wherein the amount of water does not exceed about 15% by weight of said electrolyte.

11. A storage device according to claim 9 wherein said capacitor is of the low voltage type, and wherein the amount of water does not exceed about 50% by weight of said electrolyte.

12. A storage device according to claims 9, 10, or 11 wherein the amount of water is about 6% by weight of said electrolyte.

13. A storage device according to claim 1 wherein said crosslinking agent comprises a difunctional monomer selected from the group consisting of divinyl, diacrylate and dialkacrylate compounds.

14. A storage device according to claim 13 wherein said crosslinking agent comprises tetraethyleneglycol diacrylate.

15. A storage device according to claim 1 wherein said at least one salt is selected from the group consisting of the alkali metal, alkaline earth metal, transition metal, ammonium, substituted ammonium, lead, tin, zinc and cadmium salts of mono-, di-, tri- and tetrabasic acids.

16. A storage device according to claim 15 wherein said at least one salt comprises a mixture consisting of substantially equal molar concentrations of ammonium adipate and ammonium glutarate.

17. A storage device according to claim 1 wherein said kraft paper has a thickness of between about 18 μ and about 30μ.

18. A storage device according to claim 17 wherein said Kraft paper has a thickness of about 20 μ.

19. A storage device according to claim 18 wherein said crosslinking agent comprises a difunctional monomer selected from the group consisting of divinyl, diacrylate and dialkacrylate compounds, wherein said at least one salt is selected from the group consisting of the alkali metal, alkaline earth metal, transition metal, ammonium, substituted ammonium, lead, tin, zinc and cadmium salts of mono-, di-, tri- and tetrabasic acids, and wherein said carrier comprises a crosslinked polymer matrix comprising (a) a polymeric component in which said at least one salt is soluble and which comprises at least one compound chosen from the group consisting of polyvinylpyrrolidinone, polyvinylsulfonic acid, polyhydroxyethylacrylate, polyhydroxyethylmethacrylate, polymers of the general structure

—(—CH$_2$—CR$^1$R$^2$—)

where R$^1$ is an alkyl group or hydrogen and R$^2$ is a group of the type —(—CH$_2$CHR$^3$O—)$_n$—H or of the type —CO—O—(—CH$_2$CHR$^3$O—)$_n$—H where n=0 to 20 and R$^3$ is H or CH$_3$, and copolymers thereof, (b) water in an amount between about 4% and about 50% by weight of said electrolyte, and (c) a plasticizer in which said at least one salt is soluble and which is chosen from the group consisting of ethylene glycol, polyethylene glycol 400, propylene carbonate, dimethyl formamide, dimethylsulfoxide and diethylene glycol.

20. A storage device according to claim 1 wherein said electrolyte comprises poly-2-hydroxyethylmethacrylate, ethylene glycol, ammonium adipate, ammonium glutarate, tetraethyleneglycol diacrylate and water in an amount comprising about 6% by weight of said electrolyte.

21. A storage device according to claim 1 wherein said electrolyte comprises poly-2-hydroxyethylacrylate, ethylene glycol, ammonium adipate, ammonium glutarate, tetraethyleneglycol diacrylate and water in an amount comprising about ε% by weight of said electrolyte.

22. A storage device according to claims 20 or 21 wherein said separator means comprises kraft paper having a thickness of about 20 μ.

23. In a low volume, high capacity storage device comprising an electrolytic capacitor having mechanical separator means comprising kraft paper, the improvement comprising an elastomeric electrolyte with which said separator means is impregnated, said electrolyte comprising a cross-linking agent and at least one salt in an ionically conductive carrier of high salvation power, wherein the thickness of said separator means is no greater than about 35 μ.

24. An electrolyte according to claim 23, wherein said separator means comprises kraft paper having a thickness of about 20 μ.

* * * * *